United States Patent
Halverson et al.

(10) Patent No.: US 6,436,154 B1
(45) Date of Patent: Aug. 20, 2002

(54) USE OF DODECYLBENZENE SULFONIC ACID OR SALT AS A SCALE INHIBITOR

(75) Inventors: Aileen M. Halverson; Duane S. Halverson, both of Green River, WY (US)

(73) Assignee: FMC Wyoming Corporation, Princeton, NJ (US)

( * ) Notice: Subject to any disclaimer, the term of this patent is extended or adjusted under 35 U.S.C. 154(b) by 118 days.

(21) Appl. No.: 09/676,259

(22) Filed: Sep. 28, 2000

(51) Int. Cl.$^7$ .................................................. C01D 7/00
(52) U.S. Cl. .................. 23/302 T; 423/206.2; 423/421; 210/698; 299/5
(58) Field of Search ................................ 423/421, 422, 423/206.2, 184, 265; 23/302 T, 300; 210/698; 299/5

(56) References Cited

U.S. PATENT DOCUMENTS

| | | | |
|---|---|---|---|
| 3,904,733 A | * | 9/1975 | Gancy et al. ............. 423/206.2 |
| 4,049,774 A | | 9/1977 | Harper et al. ............... 423/319 |
| 4,902,824 A | | 2/1990 | Syrinek ....................... 560/248 |
| 5,062,962 A | | 11/1991 | Brown et al. ................ 210/698 |
| 5,142,003 A | * | 8/1992 | Usuki et al. ................. 526/348 |
| 5,156,706 A | | 10/1992 | Sephton ..................... 159/47.1 |
| 5,562,830 A | | 10/1996 | Zidovec et al. ............. 210/699 |
| 5,616,278 A | | 4/1997 | Carey et al. ................ 210/698 |
| 5,788,866 A | * | 8/1998 | Fong et al. ................. 210/697 |
| 5,866,011 A | | 2/1999 | McGiffney .................. 210/698 |
| 6,022,516 A | | 2/2000 | Copenhafer et al. ........ 423/421 |
| 6,312,659 B1 | * | 11/2001 | Wise .......................... 423/430 |

FOREIGN PATENT DOCUMENTS

GB          1412938          10/1971

OTHER PUBLICATIONS

Derwent Abstract of SU 297,266 (Jun. 1974).*

* cited by examiner

Primary Examiner—Ngoc-Yen Nguyen
(74) Attorney, Agent, or Firm—TraskBritt

(57) ABSTRACT

The formation of scale on equipment surface in contact with sodium alkali containing brines is inhibited by the addition of an alkylbenzene sulfonic acid or salt thereof to the brines.

19 Claims, 1 Drawing Sheet

USE OF DODECYLBENZENE SULFONIC ACID OR SALT AS A SCALE INHIBITOR

BACKGROUND OF THE INVENTION

1. Field of the Invention

The present invention relates to the inhibition of scale formation from sodium alkali containing brines. More specifically, the invention relates to the use of alkylbenzene sulfonic acids, or salts thereof, to inhibit scale formation on processing and handling equipment contacting sodium alkali containing brines.

2. State of the Art

Soda ash and other sodium containing products may be produced from Trona ($Na_2CO_3 \cdot NaHCO_3 \cdot 2H_2O$), or other sodium containing ores (e.g. nahcolite, $NaHCO_3$), using well known dry-mining or solution-mining processes. In either case, the sodium containing ore is dissolved in an aqueous media to form a sodium alkali containing brine. Representative examples of such dry-mining and solution-mining processes are described in U.S. Pat. No. 4,557,910 issued to Meadow, U.S. Pat. No. 5,262,134 issued to Frint et al., U.S. Pat. No. 5,283,054 issued to Copenhafer et al., and U.S. Pat. No. 5,766,270 issued to Neuman et al.

An unfortunate and highly disadvantageous problem of both the dry and solution mined processes is the formation of scale on the surfaces of equipment used to handle and process the sodium alkali containing brines formed in such processes. For example, magnesium containing minerals are often present in sodium carbonate and/or bicarbonate containing ores as impurities. Some of these are soluble in aqueous media. As a sodium containing ore is dissolved to form a sodium alkali containing brine, some of the magnesium and other polyvalent metals containing minerals are also dissolved in the brine. When the equilibrium solubility of magnesium or such other metals in the brine is exceeded, scale formation is likely to result. This may occur with the elevation of the brine temperature or elevation of the magnesium concentration in the brine. Because magnesium solubility decreases with temperature, magnesium scale formation is particularly exacerbated by the elevated temperatures encountered in soda ash production processes. However, scale may also form at ambient temperatures, although at a slower rate. The formation of magnesium scale in the process impedes production and hinders process efficiency.

Scale formation in soda ash production processes includes the formation of both crystalline salt scales and amorphous scales. Oftentimes, the scales contain magnesium, calcium, silicon, and/or other divalent metals, especially alkaline earth metals. Some common magnesium containing scales include eitelite ($Na_2CO_3 \cdot MgCO_3$) and bradleyite ($Na_3Mg(PO_4)(CO_3)$). Calcium containing scales, such as pirssonite ($Na_2CO_3 \cdot CaCO_3 \cdot 2H_2O$), and silicon containing scales, such as analcime ($NaAlSi_2O_6 \cdot H_2O$), are also found in soda ash production processes. Scales may form from compositions of these various chemical compounds.

The scale formations generally found in equipment handling sodium carbonate and/or bicarbonate brines have essentially contained polyvalent metal cations and carbonate or oxide anions as well as sodium cations. Sulfate containing scales have generally not been a problem in handling sodium alkali brines used in the ultimate production of soda ash or other sodium containing products.

Typically, scale forms on the surfaces of heat exchangers, pipes, filters, tanks, clarifiers, valves, or any other equipment in contact with sodium alkali containing brines or slurries in soda ash production processes. Scale must be removed from the process equipment on a regular basis to maintain acceptable process conditions and efficiencies. Scale removal is usually accomplished by acid cleaning. This requires a shutdown of the process while the equipment is dismantled, cleaned, and put back together. Such shutdowns are both expensive and time consuming.

In an attempt to decrease the amount of cleaning required, and thus the number of process shutdowns, scale inhibitors are added to the brine streams. A number of different scale inhibitors are currently used to reduce the amount and rate of scale formation on process equipment. Some examples of scale inhibiting additives include HEDPA (1-hydroxyethylidene-1,1-diphosphonic acid), ATMP (aminotri(methylenephosphonic acid)), DETPMP (diethylenetriaminepentakis(methylenephosphonic acid)), and polycarboxylate and polyphosphonate polymers and copolymers. Such additives, however, are often costly and may reside as contaminates in the sodium containing products.

Other chemicals may be added to the sodium alkali containing brines in soda ash production processes as well. Although it has not been used as a scale inhibitor in sodium alkali brine processes, dodecylbenzene sulfonic acid has been added to sodium sesquicarbonate crystallizers to improve the crystal habit of sodium sesquicarbonate crystals formed within the crystallizer. Addition of the dodecylbenzene sulfonic acid commonly occurs within the crystallizer. However, dodecylbenzene sulfonic acid has also been added to a crystallizer-ready sodium alkali containing brine at the point where the crystallizer-ready sodium alkali containing brine is fed to a crystallizer. Dodecylbenzene sulfonic acid has heretofore not been introduced anywhere else in the brine handling portion of a soda ash production process.

In an unrelated field, see U.S. Pat. No. 5,156,706, dodecylbenzene sulfonic acid has been disclosed as a scale inhibitor for sulfate type scales formed in waste water evaporators wherein the scale was identified as a calcium sulfate containing scale.

A cost-effective, benign scale inhibitor for use in sodium alkali containing brines which inhibits the formation of scales associated with the production of soda ash from such brines without adversely affecting other aspects of such brine processes is desirable to decrease the frequency, cost and time associated with process shutdowns for scale removal.

BRIEF SUMMARY OF THE INVENTION

In one aspect of the invention, alkylbenzene sulfonic acids, or salts thereof, are added to sodium alkali containing brines to inhibit scale formation from the brines caused by polyvalent metal ions and carbonate and/or silicate and/or oxide anions in the presence of sodium cations, onto processing and handling equipment in contact with the brines. In the specification and the claims, the term "sodium alkali containing brine" includes brines comprising sodium carbonate, sodium bicarbonate and/or a combination of sodium carbonate and sodium bicarbonate. Such brines may be processed to form crystals of sodium carbonate, sodium bicarbonate, and/or crystals of carbonate and bicarbonate in physical combination or in chemical combination such as sodium sesquicarbonate. The crystals may be hydrated or non-hydrated.

In one embodiment of the present invention, dodecylbenzene sulfonic acid, or its salt (individually and collectively "DDBSA"), is added to a sodium alkali containing brine in a sodium sesquicarbonate production process to prevent the formation of sodium containing, polyvalent metal containing salts, such as eitelite scale on production and handling equipment. Although DDBSA may be added to a crystallizer, or to a crystallizer-ready sodium alkali containing brine, to improve crystallization habit in a sodium sesquicarbonate production process, DDBSA has heretofore not been added upstream of the crystallizer and heretofore has not been added for the intentional purpose of scale inhibition.

In the present invention, DDBSA is added upstream of the crystallizer to inhibit scale formation in piping and equipment leading to the crystalizer. The addition of DDBSA to a sodium alkali containing brine decreases the formation of eitelite or other complex carbonate scale on pipes, filters, tanks, and other production equipment which come in contact with sodium alkali containing brines used in various sodium carbonate and/or sodium bicarbonate production processes. It is theorized that the DDBSA alters the crystalline structure of eitelite scale, if and when it forms, resulting in a less adherent crystal which is easily removed from process equipment. The addition of DDBSA to sodium alkali brine streams also hinders or prevents the formation of calcium containing scales, magnesium containing scales, carbonate containing scales and silicon containing scales (e.g. pirssonite, bradleyite, and analcime).

Alkylbenzene sulfonic acids, such as DDBSA, are also useful as scale inhibitors in other processes involving sodium alkali containing brine solutions and slurries. For example, alkylbenzene sulfonic acids may be used to inhibit scale formations in pipes used to transport or pump sodium alkali containing brines from one location to another location. Alkylbenzene sulfonic acids are useful as scale inhibitors in sodium carbonate monohydrate, sodium carbonate decahydrate, sodium bicarbonate and sodium sesquicarbonate production processes or other sodium containing crystal production wherein process equipment and transporting piping is exposed to sodium alkali containing brines.

The term "inhibitor" or "inhibition" as used herein means that scale formation quantity is reduced or the character of the scale formation is changed, e.g. the adherent nature of the scale is reduced or the scale is less dense, any or all of which effects render the scale easier to remove and/or be more quickly removed.

The alkylbenzence sulfonic acids may be added to the sodium alkali brines in salt form, e.g. as sodium or other alkali metal salts, ammonium salts, or similar water soluble salts. It will be recognized, also, that such salts may inherently form when the alkylbenzene sulfonic acids are added to the brines.

BRIEF DESCRIPTION OF THE DRAWINGS

While the specification concludes with claims particularly pointing out and distinctly claiming that which is regarded as the present invention, the advantages of this invention can be more readily ascertained from the following description of the invention when read in conjunction with the accompanying drawings in which:

DESCRIPTION OF THE ILLUSTRATED EMBODIMENTS

Figure 1:
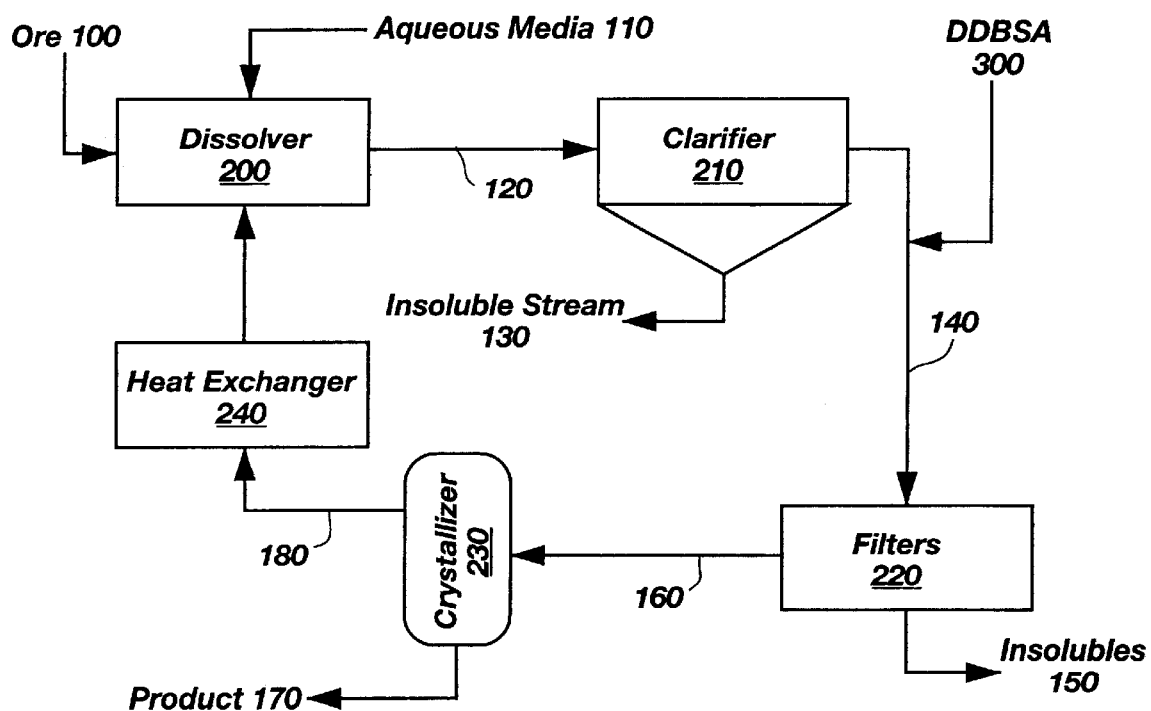
FIG. 1 is a simplified flow diagram of a sodium sesquicarbonate production process employing one embodiment of the present invention.

The present invention involves the addition of an alkylbenzene sulfonic acid as a scale inhibitor to a sodium alkali containing brine solution or slurry. It has been found that the addition of an alkylbenzene sulfonic acid, or its salt, to sodium alkali containing brine solutions substantially inhibits the formation of magnesium, carbonate, calcium, or silicon containing scales also containing sodium and carbonate ions, on process equipment contacting such brine solutions. It is believed that the addition of an alkylbenzene sulfonic acid to a sodium alkali containing brine affects these scales such that scale formation structure is altered, scale formation is minimized, or scale adherence is decreased. Use of an alkylbenzene sulfonic acid as a scale inhibitor is advantageous because it is cheaper than many of the scale inhibitors currently used, it decreases the number of process shutdowns required to clean the equipment, thereby providing an additional cost savings, and its addition to such a process does not adversely affect the crystal habit of a crystallizer. Generally, it tends to improve crystallization.

The preferred alkylbenzene sulfonic acids used for scale inhibition in sodium alkali containing brines are linear alkylbenzene sulfonic acids, otherwise known as "LAS." The active ingredient in LAS has the chemical formula $CH_3(CH_2)_nC_6H_4SO_3H$. LAS compounds useful as scale inhibitors are those in which the alkyl group has between about 8 and 16 carbon atoms, in other words, where n is between about 7 and about 15. Branched-chain alkylbenzene sulfonic acids may also be used, however, they are not as readily available due to environmental concerns.

An exemplary description of the present invention can be made with reference to FIG. 1. FIG. 1 illustrates a representative sodium sesquicarbonate production process, however, it is not meant to be inclusive of all such processes. The first step in the production of sodium sesquicarbonate involves the introduction of a sodium containing ore 100 and an aqueous media 110 to a dissolver 200. The ore 100 is dissolved by the aqueous media 110 in the dissolver 200 forming a dissolver overflow liquor 120 which includes a sodium alkali containing brine and insolubles. The sodium alkali containing brine may include dissolved sodium carbonate and/or sodium bicarbonate. The dissolver overflow liquor is fed to a clarifier 210 where a significant quantity of the insolubles are settled out and removed as insoluble stream 130. The remaining sodium alkali containing brine leaves the clarifier 210 as clarifier overflow liquor 140. The clarifier overflow liquor 140 passes through filters 220 where additional insoluble material is removed by the filters 220 and purged as insoluble stream 150. The filtered sodium alkali containing brine 160 is then passed to a crystallizer 230 where sodium sesquicarbonate crystals are formed and removed as product stream 170. Brine solution which does not crystallize is removed from the crystallizer 230 as crystallizer purge stream 180. As illustrated in FIG. 1, crystallizer purge stream 180 is utilized as a recycle stream to the dissolver 200. This is not necessary in the sodium sesquicarbonate production process, but it is common. If crystallizer purge stream 180 is used as a recycle stream to facilitate dissolution of ore 100 in the dissolver 200, the crystallizer purge stream 180 is often heated in a heat exchanger 240. The heated crystallizer purge stream 180 may be fed to the dissolver 200 along with ore 100 and aqueous media 110.

Scale buildup is common in the process illustrated in FIG. 1. For example, a sodium alkali containing brine formed in the process typically includes dissolved magnesium from the ore 100. As the magnesium concentration rises, or the temperature in the process increases, the magnesium exceeds its solubility limit and a sodium magnesium carbonate ($Na_2CO_3MgCO_3$) or "eitelite" scale forms on the process equipment. Pipes transporting clarifier overflow liquor 140 and filtered sodium alkali containing brine 160 become encrusted with scale. Likewise, scale forms on the filters 220, clogging the filters 220 and reducing the throughput of the filters 220. Scale buildup may also occur in the clarifier 210 and in pipes between the dissolver 200 and the clarifier 210. Essentially any surface in contact with a sodium alkali containing brine is subject to the unwanted scale formation.

Scale formation in a sodium sesquicarbonate production process may be hindered by one embodiment of the present invention. Dodecylbenzene sulfonic acid, or its salt, may be added to the clarifier overflow liquor 140 to inhibit scale formation. Dodecylbenzene sulfonic acid or its salt (individually and collectively "DDBSA") is available commercially, generally as an 87–96% by weight active solution based upon the free acid. DDBSA is a LAS having $CH_3(CH_2)_nC_6H_4SO_3H$ as the active ingredient where n is about 11 on average. It has been found that the addition of about 1 ppm of DDBSA to the clarifier overflow liquor 140 reduces the amount of eitelite scaling forming downstream in a sodium sesquicarbonate production process. The necessary amount of DDBSA may be added directly to the clarifier overflow liquor 140 by optional DDBSA stream 300 as illustrated in FIG. 1. Generally, the addition of about 0.1 ppm to about 100 ppm of DDBSA will be effective in the embodiment of FIG. 1 or other application. However, process conditions, cost and other variables may require increased or decreased concentrations of DDBSA, and the DDBSA (or other alkylbenzene sulfonic acid or salt) may be injected in single doses, as a plurality of timed injections, or, preferably, continuously, in order to maintain effective concentrations. A preferred range is about 1 to 50 ppm.

In this embodiment of the invention, optional DDBSA stream 300 is a continuous stream which maintains a relatively constant DDBSA concentration between the clarifier 210 and the crystallizer 230. It has been found that very little, if any, DDBSA is removed from the process by the filters 220 or insoluble stream 150. Therefore, the concentration of DDBSA in the system remains relatively constant. In alternate embodiments of the present invention, if DDBSA, or another LAS scale inhibitor, are being lost to purge streams or process equipment, additional LAS streams could be added in the process to make up for the lost scale inhibitor or to maintain relatively constant LAS concentrations throughout the process.

It has also been recognized that small quantities of background DDBSA may enter the dissolver 200 with the heated crystallizer purge stream 180 in sodium sesquicarbonate production processes using crystallizer purge stream 180 as a recycle stream. Although DDBSA may act as a crystal habit modifier within the crystallizer, not all of the DDBSA is removed from crystallizer 230 with product 170. The presence of DDBSA in crystallizer purge stream 180 hinders the formation of scale in the heat exchanger 240 and in pipes transporting the crystallizer purge stream 180 between the crystallizer 230, the heat exchanger 240, and the dissolver 200. The DDBSA in the recycle stream is passed to the dissolver and inhibits the formation of scale therein as well.

In alternative embodiments of the present invention (not shown), DDBSA may be added to the sodium sesquicarbonate production process at the following locations: DDBSA is added with the ore 100 and aqueous media 110 in the dissolver; DDBSA is added to the dissolver overflow liquor 120; DDBSA is added in the clarifer 210; DDBSA is added at the filters 220; or DDBSA is added to the crystallizer purge stream 180 as it leaves the crystallizer 230.

Addition of DDBSA to the sodium sesquicarbonate production process at any point before optional DDBSA stream 300 runs the risk of losing some of the DDBSA to the insoluble streams. Although insolubles make up less than one percent (1%) of the dissolver overflow liquor 120, portions of DDBSA added to the system before the insolubles are purged by insoluble stream 130 may also be purged with insoluble stream 130. As explained above, however, additional DDBSA may be added to the system to make up for any DDBSA purged from the process.

Furthermore, the addition of DDBSA to the crystallizer purge stream 180 provides an additional advantage when the crystallizer purge stream 180 is being recycled. DDBSA hinders the formation of scale in the heat exchanger 240 and also provides a DDBSA presence in the dissolver 200 and the clarifier 210, thereby hindering scale formation therein as well.

The ability of DDBSA to hinder scale formation has been observed in a sodium sesquicarbonate production process similar to that illustrated in FIG. 1. In the observed process, clarifier overflow liquor 140 was split into two streams, stream 1 and stream 2, which were then processed using separate equipment. Various concentrations of DDBSA were added to stream 1 while stream 2 was maintained as a control or normal stream. It was found that the pipes, filters and other process equipment of stream 1 were relatively clear of eitelite scaling while the pipes, filters and other process equipment of stream 2 were coated with scale.

The scale inhibiting qualities of DDBSA were tested by inserting stainless steel coupons into DDBSA treated stream 1 and untreated stream 2. Magnified photographs of the coupons after exposure for a constant period of time revealed small, intermingled, yellow-brown colored crystals forming a hard, sheet-like scale layer over the coupon exposed to untreated stream 2. The coupon exposed to DDBSA treated stream 1, however, revealed the presence of very few crystals, and the crystals which did form were easily removed from the coupon with minimal scraping force. The presence of DDBSA was there demonstrated to be inhibiting scale formation.

Initially it was thought that the addition of DDBSA to sodium alkali containing brines increased the scale solubility in the brine, thereby preventing the formation of scale. For example, in sodium sesquicarbonate production processes eitelite scaling occurs when the concentration of magnesium in a sodium alkali containing brine exceeds the solubility limits. The addition of DDBSA to the brine appeared to hinder the formation of eitelite scale, thus it was believed that a greater quantity of magnesium was remaining in solution. However, testing and mass balances have shown that the amount of magnesium present in the sodium alkali containing brines of sodium sesquicarbonate production processes is not changed by the addition of DDBSA. This indicates that the solubility limit of magnesium is not increasing. Therefore, the magnesium in the brine solution is leaving the system in an alternate form, most likely as a mixture of amorphous and crystallized material being filtered from the brine and purged with insoluble stream 150. It is also believed that the presence of DDBSA in a sodium alkali containing brine alters the crystal formation of eitelite scale such that the crystals are less adherent to surfaces and may therefore be filtered from the brine.

Although the invention is described in terms of DDBSA used in a sodium sesquicarbonate production process, it is understood that DDBSA or another LAS having as the active ingredient the chemical $CH_3(CH_2)_nC_6H_4SO_3H$ with n between about 7 and 15, will inhibit the formation of scale in various sodium alkali containing brines, solutions, and slurries. For example, LAS compounds may be added to the sodium alkali containing brines of sodium carbonate monohydrate production processes. Other sodium alkali containing brines, such as sodium carbonate brines, sodium bicarbonate brines, or brines containing both sodium carbonate and sodium bicarbonate may also be treated with LAS according to the present invention to hinder the formation of scale from such brines.

The sodium alkali containing brines to which DDBSA or other alkylbenzene sulfonic acids are added may be generally referred to as raw brines, i.e. brines which have not been treated to remove any dissolved ionic species.

Scale buildup may also occur in handling processes such as slurry or solution transportation. In many instances, a sodium alkali slurry or solution is pumped from an origin, in an underground deposit being solution mined, to a production facility. Scale buildup in the pipes and equipment handling the slurry or solution is both common and undesirable. For example, trona, nahcolite, or other sodium containing ore being solution-mined at one location may be extracted from the mine as a raw mine brine and pumped through a pipeline to a production facility for processing. Any scale buildup in the pipes and equipment between the mine and the production facility ultimately increases production costs and volume throughput. Furthermore, if heat exchangers are used along such a transportation pipeline to maintain the temperature of the slurry or solution being transported, the heat exchangers are also subject to scaling. Scale buildup decreases the throughput of the pipes and ultimately the process rate at the production facility. Eventually, the scale must be removed using cleaning processes. Depending upon the size of the pipes and the distance that the brine is pumped, cleaning processes can be very expensive.

LAS compounds not only hinder the formation of scale on equipment contacting sodium alkali containing brine solutions, but they do so at a reduced cost over traditional scale inhibiting compositions. Furthermore, in many sodium alkali production processes, addition of LAS also improves the crystal habit of desired species crystallized from the solution to which it is added. Use of LAS as a scale inhibitor is desirable because it helps to reduce the number of plant shutdowns, it decreases the costs associated with cleaning the process equipment and it provides a mechanism whereby scale formation may be purged from the system in the form of less adherent crystals or amorphous precipitates.

The invention has been found to effectively inhibit eitelite scaling in a sodium sesquicarbonate production process. It is understood that the addition of LAS to sodium alkali containing brine solutions, especially raw brines, also inhibits the formation of various other calcium, magnesium, carbonate, or silicon containing scales in other sodium alkali brine processes.

Unless otherwise indicated all parts and percentages are by weight and all temperatures are centigrade.

Having thus described certain preferred embodiments of the present invention, it is to be understood that the invention defined by the appended claims is not to be limited by particular details set forth in the above description, as many apparent variations thereof are possible without departing from the spirit or scope thereof as hereinafter claimed.

What is claimed is:

1. A method of inhibiting the formation of scale on equipment in contact with a sodium alkali containing brine solution prior to the introduction of said sodium alkali containing brine solution to a crystallization step, comprising:

adding an alkylbenzene sulfonic acid or salt thereof to the sodium alkali containing brine in an amount effective to inhibit scale formation in equipment upstream from the crystallization step.

2. The method of claim 1 wherein the sodium alkali containing brine comprises a sodium carbonate containing brine.

3. The method of claim 1 wherein the sodium alkali containing brine comprises a sodium bicarbonate containing brine.

4. The method of claim 1 wherein the sodium alkali containing brine comprises a brine containing both sodium carbonate and sodium bicarbonate.

5. The method of claim 1 wherein the sodium alkali containing brine comprises a brine resulting from the dissolution of trona in an aqueous solution.

6. The method of claim 1 wherein the sodium alkali containing brine comprises a brine resulting from the dissolution of nahcolite in an aqueous solution.

7. The method of claim 1 wherein the alkylbenzene sulfonic acid comprises a linear alkylbenzene sulfonic acid of the formula $CH_3(CH_2)_nC_6H_4SO_3H$ wherein n is about 7 to about 15.

8. The method of claim 1 wherein the alkylbenzene sulfonic acid comprises a linear alkylbenzene sulfonic acid or salt thereof in an amount of about 0.1 ppm to about 100 ppm.

9. The method of claim 1 wherein the alkylbenzene sulfonic acid or salt comprises a linear alkylbenzene sulfonic acid or salt thereof in an amount of about 1 ppm to about 50 ppm.

10. The method of claim 1 wherein the alkylbenzene sulfonic acid comprises dodecylbenzene sulfonic acid or salt thereof.

11. The method of claim 10 wherein the dodecylbenzene sulfonic acid has the formula $CH_3(CH_2)_nC_6H_4SO_3H$, wherein n is about 11 on average.

12. The method of claim 10 wherein the dodecylbenzene sulfonic acid or salt thereof is added in an amount of about 0.1 ppm to about 100 ppm.

13. A method for producing sodium sesquicarbonate, comprising:

providing a clarifier, a filter, and a crystallizer, the clarifier attached to the filter by a first series of pipes, the filter attached to the crystallizer by a second series of pipes;

introducing a sodium alkali containing brine to the clarifier, passing the resulting clarified sodium alkali containing brine from the clarifier through the first series of pipes to the filter, adding a linear alkylbenzene sulfonic acid or salt thereof to the sodium alkali containing brine passing through the first series of pipes between the clarifier and the filter to form a mixture, the linear alkylbenzene sulfonic acid or salt being added in an amount effective to inhibit scale formation; and passing the mixture through the filter and passing the filtered mixture through the second series of pipes to the crystallizer; and crystallizing sodium sesquicarbonate from the filtered mixture.

14. A scale-resistant sodium alkali containing raw brine, comprising:

a raw sodium alkali containing brine; and a scale formation inhibiting amount of a linear alkylbenzene sulfonic acid or salt thereof.

15. The scale-resistant sodium alkali containing raw brine of claim 14 wherein the raw sodium alkali containing brine comprises sodium carbonate and/or sodium bicarbonate in solution.

16. The scale-resistant sodium alkali containing raw brine of claim 14 wherein the linear alkylbenzene sulfonic acid has the formula $CH_3(CH_2)_n C_6H_4SO_3H$, wherein n is about 7 to about 15.

17. In a process of crystallizing sodium based crystals from a sodium alkali containing brine wherein a crystalline carbonate scale containing polyvalent metal ions and sodium ions is formed on process equipment contacting the sodium alkali containing brine, the improvement comprising the addition of dodecylbenzene sulfonic acid or salt thereof to the sodium alkali containing brine.

18. A method of inhibiting a raw mine brine from forming scale when the raw mine brine is in contact with a metal surface, comprising:

adding an alkylbenzene sulfonic acid or salt thereof to the raw mine brine in an amount sufficient to inhibit scale formation.

19. A raw sodium alkali mine brine having reduced scale forming characteristics comprising an aqueous solution of sodium carbonate and/or sodium bicarbonate, scale forming salts of polyvalent metals, and an amount of dodecylbenzene sulfonic acid or salt thereof effective to inhibit scale formation.

* * * * *